United States Patent
Kim et al.

(10) Patent No.: US 9,002,580 B2
(45) Date of Patent: Apr. 7, 2015

(54) SYSTEM AND METHOD FOR CONTROLLING ELECTRICALLY-POWERED STEERING APPARATUS OF VEHICLE

(75) Inventors: Nam Young Kim, Gunpo-si (KR); Yoon Su Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 310 days.

(21) Appl. No.: 13/534,937

(22) Filed: Jun. 27, 2012

(65) Prior Publication Data
US 2013/0151077 A1    Jun. 13, 2013

(30) Foreign Application Priority Data
Dec. 8, 2011    (KR) .......................... 10-2011-0131199

(51) Int. Cl.
*B62D 6/00* (2006.01)

(52) U.S. Cl.
CPC ...................................... *B62D 6/007* (2013.01)

(58) Field of Classification Search
CPC ............. B62D 1/00; B62D 5/00; B62D 5/04; B62D 6/007
USPC .................... 701/41; 180/446, 421, 422, 444; 340/465, 475
See application file for complete search history.

(56) References Cited

U.S. PATENT DOCUMENTS

| | | | | |
|---|---|---|---|---|
| 2005/0092542 A1* | 5/2005 | Turner | ........................... | 180/446 |
| 2005/0247513 A1* | 11/2005 | Turner | ........................... | 180/444 |
| 2006/0090952 A1* | 5/2006 | Ito | ................................ | 180/446 |
| 2008/0243339 A1* | 10/2008 | Nishimori et al. | ............... | 701/41 |
| 2009/0152044 A1* | 6/2009 | Ito et al. | ........................ | 180/444 |
| 2009/0260913 A1* | 10/2009 | Ito et al. | ........................ | 180/444 |
| 2011/0093167 A1* | 4/2011 | Williams et al. | ................ | 701/41 |
| 2011/0144865 A1* | 6/2011 | Niemz | ............................ | 701/42 |
| 2011/0307130 A1* | 12/2011 | Gow et al. | ....................... | 701/22 |
| 2012/0055731 A1* | 3/2012 | Lee | ................................ | 180/446 |
| 2012/0226417 A1* | 9/2012 | Nishikawa | ....................... | 701/42 |
| 2013/0013154 A1* | 1/2013 | Aoki | ................................ | 701/42 |

(Continued)

FOREIGN PATENT DOCUMENTS

| | | |
|---|---|---|
| JP | 06-206571 A | 7/1994 |
| JP | 2001-253219 A | 9/2001 |

(Continued)

OTHER PUBLICATIONS

Cohen, M.I., Allerman, A.A., Choquette, K.D., Jagadish, C., "Electrically steerable lasers using wide-aperture VCSELs," vol. 13, Issue: 6, Publication Year: 2001, pp. 544-546.*

(Continued)

*Primary Examiner* — Tuan C. To
(74) *Attorney, Agent, or Firm* — Morgan, Lewis & Bockius LLP

(57) ABSTRACT

A system and a method for controlling an electrically-powered steering apparatus of a vehicle may include a selection switch adapted to select any of a plurality of steering modes, a control switch adapted to change a current for controlling the steering force, a control portion adapted to determine the current according to a signal received from at least one of the selection switch and the control switch and to transmit a control signal according to the determined current, and a drive portion adapted to control the steering force according to the control signal received from the control portion.

9 Claims, 3 Drawing Sheets

(56) References Cited

U.S. PATENT DOCUMENTS

2013/0073146 A1* 3/2013 Konomi et al. ............. 701/41
2013/0103264 A1* 4/2013 Takashima et al. ......... 701/42
2013/0151074 A1* 6/2013 Takeuchi et al. ............ 701/37

FOREIGN PATENT DOCUMENTS

| | | |
|---|---|---|
| JP | 2002-211423 A | 7/2002 |
| JP | 3460885 B2 | 8/2003 |
| JP | 2005-319999 A | 11/2005 |
| JP | 2007-112412 A | 5/2007 |
| JP | 2010-280313 A | 12/2010 |
| KR | 1020030004913 A | 1/2003 |
| KR | 1020110001529 A | 1/2011 |

OTHER PUBLICATIONS

Kasahara, M., Kanai, Y., Mori, Y., "Vehicle braking control using sliding mode control—Switching control for speed and slip ratio," Publication Year: 2009, pp. 4047-4052.*

* cited by examiner

SYSTEM AND METHOD FOR CONTROLLING ELECTRICALLY-POWERED STEERING APPARATUS OF VEHICLE

CROSS-REFERENCE TO RELATED APPLICATION

The present application claims priority of Korean Patent Application Number 10-2011-0131199 filed Dec. 8, 2011, the entire contents of which application is incorporated herein for all purposes by this reference.

BACKGROUND OF INVENTION

1. Field of Invention

The present invention relates to a system and a method for controlling an electrically-powered steering apparatus of a vehicle, and more particularly to a system and a method for controlling an electrically-powered steering apparatus of a vehicle which can control a steering force of the vehicle.

2. Description of Related Art

Generally, a steering apparatus is mounted for changing a moving direction of a vehicle, and includes an operating apparatus delivering a force operating a steering handle by a driver to a steering gear, a gear apparatus reducing a rotational speed of a steering shaft and changing a movement direction of the operating apparatus, and a link apparatus delivering the movement of the gear apparatus to a front left wheel and a front right wheel and keeping a constant relation of the wheels.

Such the steering apparatus is not easy to change the moving direction of the vehicle by a force of a driver only. Therefore, a power steering apparatus is used to assist the steering force changing the moving direction of the vehicle. The power steering apparatus is adapted to convert hydraulic pressure into mechanical force or use a power of a motor so as to assist the steering force.

Particularly, when the steering force is assisted by the power of the motor, the steering force can be controlled according to a speed of the vehicle by changing a current transmitted to the motor. Therefore, such power steering apparatus is so configured that the steering force is controlled to be light at a low speed so as to lighten an steering effort of the driver, and to be heavy at a high speed so as to make the driver feel comfortable.

Recently, various steering modes for changing the steering force has been provided so as to satisfy various demands of the driver. In further detail, different steering forces are generated according to a driving region of the vehicle, a demand of the driver and so on at various steering modes. And, the steering force is controlled according to the speed of the vehicle at each steering mode.

However, the number of the steering modes provided in one vehicle is restricted to the specific number. That is, the specific number of the steering modes is provided based on a data obtained by supposing the driving region of the vehicle and the demand of the driver. The specific steering modes is predetermined in the vehicle. Therefore, the steering force cannot be changed variously according to the drive state of the vehicle or the demand of the driver at the predetermined steering modes when the vehicle is driven actually.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a system and a method for controlling an electrically-powered steering apparatus of vehicle having advantages of effectively controlling a steering force according to a demand of a driver.

Various aspects of the present invention provide for a system and a method for controlling an electrically-powered steering apparatus of vehicle having further advantages of facilitating control of the steering force.

Various aspects of the present invention provide for a system for controlling an electrically-powered steering apparatus of vehicle that may include a selection switch adapted to select any of a plurality of steering modes, a control switch adapted to change a current for controlling the steering force, a control portion adapted to determine the current according to a signal received from at least one of the selection switch and the control switch and to transmit a control signal according to the determined current, and a drive portion adapted to control the steering force according to the control signal received from the control portion.

The control switch may include a change switch adapted to change the current determined at the selected steering mode, and a return switch adapted to recover the current changed by the change switch to the current determined at the steering mode selected by the selection switch.

The change switch may include a first change switch adapted to change the current to weight the steering force, and a second change switch adapted to change the current to lighten the steering force.

The steering modes selected by the selection switch may include a standard mode where a steering force at a normal driving state is provided, a comfort mode where a steering force heavier than that at the standard mode is provided, and a sports mode where a steering force lighter than that at the standard mode is provided.

Various aspects of the present invention provide for a system and a method for controlling an electrically-powered steering apparatus of vehicle that may include receiving a mode signal corresponding to a steering mode selected from a plurality of steering modes by a user, receiving a change signal for changing the steering force into a steering force desired by a user at the selected steering mode, determining, if at least one of the mode signal and the change signal is received, the current corresponding to the steering force at the selected steering mode or the steering force desired by a user based on the received signals, transmitting a control signal corresponding to the determined current, and controlling the steering force according to the control signal.

The change signal may be adapted to increase or decrease the current value at the selected steering mode.

The method further comprises receiving a return signal for recovering the steering force desired by a user to the steering force at the selected steering mode, determining the current corresponding to the steering force at the selected steering mode according to the return signal.

The plurality of steering modes may include a standard mode where a steering force at a normal driving state is provided, a comfort mode where a steering force heavier than that at the standard mode is provided, and a sports mode where a steering force lighter than that at the standard mode is provided.

Various aspects of the present invention provide for a system for controlling an electrically-powered steering apparatus that may include a change switch adapted to change the steering force determined at the selected steering mode, a return switch adapted to recover the steering force changed by the change switch to the steering force determined at the steering mode selected by the selection switch, a control portion adapted to determine the current according to a signal received from at least one of the selection switch, the change switch and the return switch, and to transmit a control signal according to the determined current, and a drive portion adapted to control the steering force according to the control signal received from the control portion.

The change switch may include a first change switch adapted to change the current to weight the steering force, and a second change switch adapted to change the current to lighten the steering force.

The steering modes selected by the selection switch may include a standard mode where a steering force at a normal driving state is provided, a comfort mode where a steering force heavier than that at the standard mode is provided, and a sports mode where a steering force lighter than that at the standard mode is provided.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
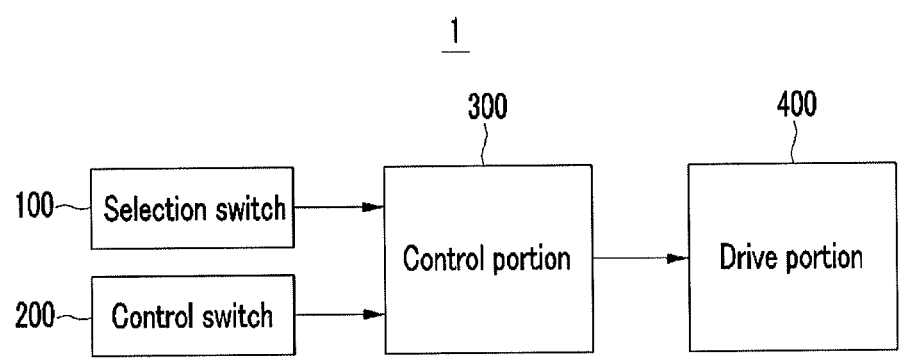
FIG. 1 and FIG. 2 are schematic diagrams of an exemplary system for controlling an electrically-powered steering apparatus of a vehicle according to the present invention.
Figure 2:
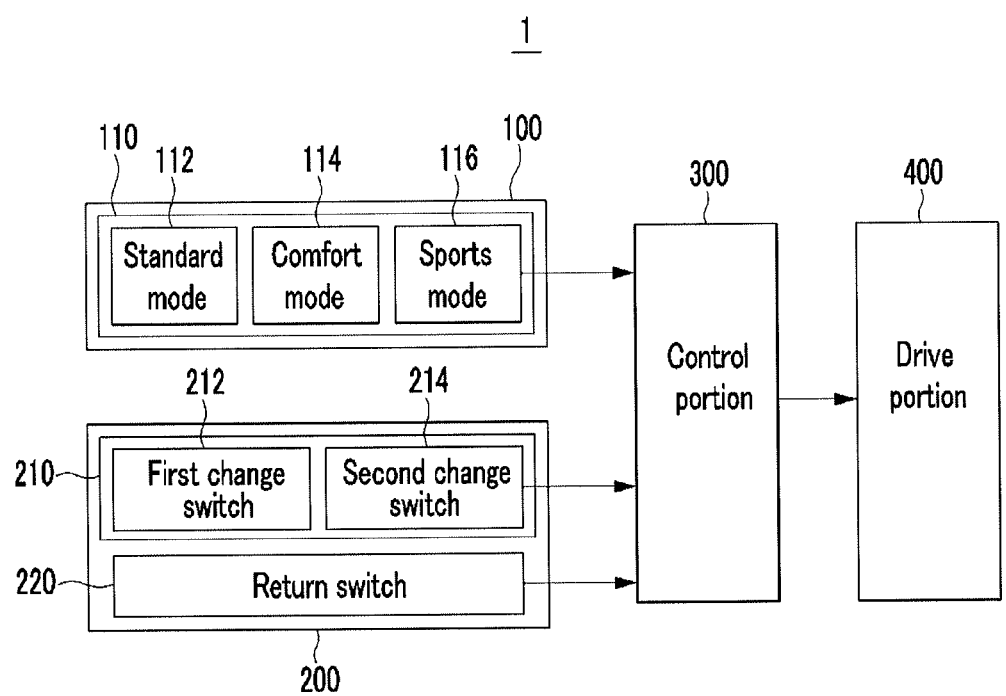

FIG. 1 and FIG. 2 are schematic diagrams of a system for controlling an electrically-powered steering apparatus of a vehicle according to various embodiments of the present invention.

The system 1 for controlling an electrically-powered steering apparatus of a vehicle is adapted to control a steering force of the vehicle according to current supplying to a motor. Referring to FIG. 1 and FIG. 2, the system 1 for controlling an electrically-powered steering apparatus of a vehicle includes a selection switch 100, a control switch 200, a control portion 300 and a drive portion 400.

The selection switch 100 is adapted to provide a plurality of steering modes 110 where different steering forces are achieved. A user can select any one of the plurality of steering modes 110 by operating the selection switch 100.

Since the steering force of the vehicle required for driving the vehicle is changed according to a speed of the vehicle, the steering forces changing according to the speed of the vehicle are differently set at each steering mode 110.

For example, the steering mode 110 may include a standard mode 112, a comfort mode 114 and a sports mode 116. Specifically, the standard mode 112 is set at a normal driving state, and the steering force at the standard mode 112 is changed according to the speed of the vehicle. If the user wants heavier steering force than that at the standard mode 112, the user can select the comfort mode 114. The steering force at the comfort mode 114 is generally larger than that at the standard mode 112 in the same speed of the vehicle. If the user wants lighter steering force than that at the standard mode 112, the user can select the sports mode 116. The steering force at the sports mode 116 is generally smaller than that at the standard mode 112 in the same speed of the vehicle.

The steering modes 110 are not limited to these three modes and various steering modes can be provided. And, such steering modes 110 may be named differently.

The control switch 200 is adapted to change a current for controlling the steering force. If the user wants to change the steering force, the user can use the control switch 200.

The control switch 200 includes a change switch 210 and a return switch 220.

The change switch 210 is adapted to change the current provided at the steering mode 110 selected by the selection switch 100. The change switch 210 includes a first change switch 212 adapted to change the current so as to generate a heavier steering force and a second change switch 214 adapted to change the current so as to generate a lighter steering force.

The return switch 220 is adapted to recover the current changed by the change switch to a current determined at the steering mode 110 selected by using the selection switch 100.

For example, if the user selects the comfort mode 114 in the selection switch 100 and operates the second change switch 214 to change the current so as to lighten the steering force provided at the comfort mode 114, the steering force during driving the vehicle is lighter than that determined at the comfort mode 114

At this time, if the user wants to return the comfort mode 114, the user operates the return switch 220 to return the comfort mode 114 selected by using the selection switch 100.

The change switch 210 and the return switch 220 may be provided at a steering handle, a dashboard, and so on in a various forms. For example, the change switch 210 is provided in a paddle shift type. In this case, the first change switch 212 and the second change switch 214 may be provided respectively in the left and the right so as to control the current. In addition, the change switch 210 may be a button type, a switch type, a lever switch type or a dial switch type. The return switch 220 may be provided in the same type as the change switch 210, and is coupled some portion of the change switch 210.

The control portion 300 detects the current according to a signal received from the selection switch 100 and the control switch 200, and transmits a control signal according to the detected current. The drive portion 400 is adapted to receive the control signal and control the steering force of the steering handle based thereon.

When the steering mode 110 is selected in the selection switch 100, the control portion 300 transmits the current of the selected steering mode to the drive portion 400. However, if the current is change by the control switch 200 after the steering mode 110 is selected in the selection switch 100, the control portion 300 changes the control signal by reflecting the changed current and transmits the changed control signal to the drive portion 400.

In further detail, if the user operates the first change switch 212, the control portion 300 changes the control signal corresponding to the current provided at the steering mode 110 and transmits the changed control signal to the drive portion 400 so as to weight the steering force. Also, if the user operates the second change switch 214, the control portion 300 changes the control signal corresponding to the current provided at the steering mode 110 and transmits the changed control signal to the drive portion 400 so as to lighten the steering force.

Also, if the user operates the return switch 220, the control portion 300 is adapted to recover the current changed by the first change switch 212 and/or the second change switch 214 to the current value selected in steering mode 110, and transmits the recovered current value to the drive portion 400.

Figure 3:
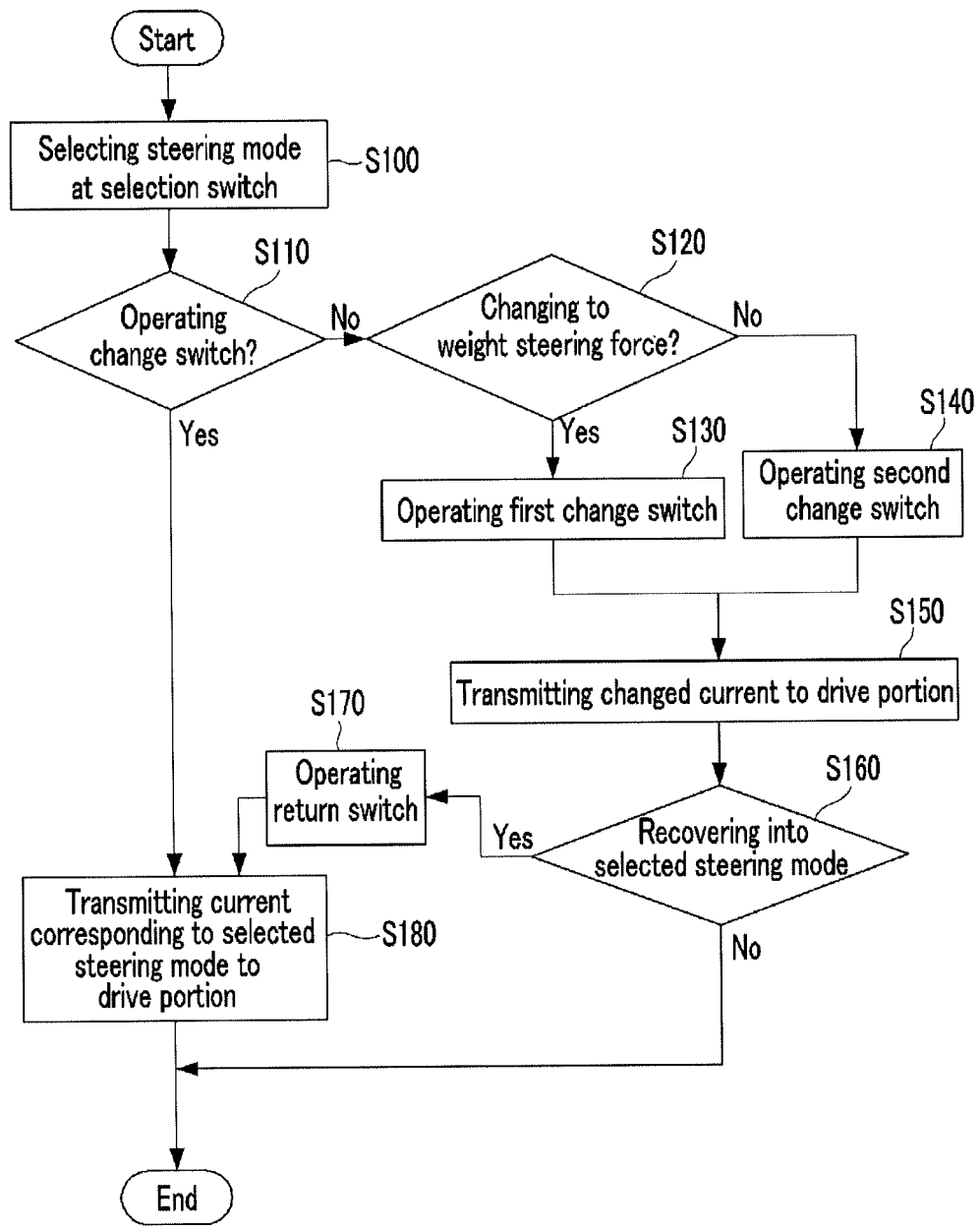
FIG. 3 is a flowchart of an exemplary method for controlling an electrically-powered steering apparatus of a vehicle using a system according to the present invention.

FIG. 3 is a flowchart of a method for controlling an electrically-powered steering apparatus of a vehicle using a system according to various embodiments of the present invention.

Referring to FIG. 3, a method for controlling the system 1 will be described in detail.

If the user selects any one of the plurality of steering modes 110 provided in the selection switch 100 at step S100, the control portion 300 can be adapted to control the steering force according to the selected steering mode 110. And, if the user determines whether the change switch 210 is operated at step S110 and then operates the change switch 210, the control portion is adapted to change the steering force provided at the selected steering mode 110 into the steering force controlled by the user.

Particularly, if the user wants to weight the steering force at step S120, the user operates the first change switch 212 so as to change the current at step S130. Also if the user wants to lighten the steering force, the user operates the second change switch 214 so as to change the current value at step S140.

The control portion 300 transmits to the drive portion 400 the control signal corresponding to the current at the selected steering mode 110 or the current changed by the change switch 210, and the drive portion 400 is adapted to control the steering force according to the received control signal at steps S180 and S150.

And, in a case that the current is changed by operating the change switch 210 and the steering force is controlled according to the changed current, the user operates the return switch 220 so as to return to the steering mode 110 selected in the selection switch 100 at steps S160 and S170. That is, the current changed by operating the change switch 210 is recovered to the current at the steering mode 110 selected in the selection switch 100 at the step S180 such that the steering force is also changed according to the current of the steering mode 110.

According to various embodiments, the system 1 for controlling the steering force base on the current, is disclosed. However, the present invention is not limited to various embodiments and is adapted to control the steering force in various method types.

According to various embodiments of the present invention, the steering force may be effectively controlled according to the demand of the user.

According to various embodiments of the present invention, the steering force may be controlled by a simple operation.

For convenience in explanation and accurate definition in the appended claims, the terms left or right, front, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for controlling an electrically-powered steering apparatus comprising:
    a selection switch adapted to select any of a plurality of steering modes;
    a control switch adapted to change a current for controlling the steering force;
    a control portion adapted to determine the current according to a signal received from at least one of the selection switch and the control switch and to transmit a control signal according to the determined current; and
    a drive portion adapted to control the steering force according to the control signal received from the control portion,
    wherein the control switch comprises:
        a change switch adapted to change the current determined at the selected steering mode; and
        a return switch adapted to recover the current changed by the change switch to the current determined at the steering mode selected by the selection switch.

2. The system of claim 1, wherein the change switch comprises:
    a first change switch adapted to change the current to weight the steering force; and
    a second change switch adapted to change the current to lighten the steering force.

3. The system of claim 1, wherein the steering modes selected by the selection switch comprise:
    a standard mode where a steering force at a normal driving state is provided;
    a comfort mode where a steering force heavier than that at the standard mode is provided; and
    a sports mode where a steering force lighter than that at the standard mode is provided.

4. A method for controlling an electrically-powered steering apparatus that controls a steering force according to a current, comprising:
    receiving a mode signal corresponding to a steering mode selected from a plurality of steering modes by a user;
    receiving a change signal for changing the steering force at the selected steering mode into a steering force desired by the user;
    determining, if at least one of the mode signal and the change signal is received, a first current corresponding to the steering force at the selected steering mode based on the received mode signal or a second current of the steering force desired by the user based on the received change signal;

transmitting a control signal corresponding to the determined first and second currents; and receiving a return signal from a return switch for recovering the steering force desired by the user to the steering force at the selected steering mode of the mode signal;

determining the first current corresponding to the steering force at the selected steering mode selected according to the return signal of the return switch; and controlling the steering force according to the control signal.

5. The method of claim 4, wherein the change signal is adapted to increase or decrease the current value at the selected steering mode.

6. The method of claim 4, wherein the plurality of steering modes comprise:

a standard mode where a steering force at a normal driving state is provided;

a comfort mode where a steering force heavier than that at the standard mode is provided; and a sports mode where a steering force lighter than that at the standard mode is provided.

7. A system for controlling an electrically-powered steering apparatus comprising:

a selection switch adapted to select any of a plurality of steering modes;

a change switch adapted to change the steering force determined at the selected steering mode;

a return switch adapted to recover the steering force changed by the change switch to the steering force determined at the steering mode selected by the selection switch;

a control portion adapted to determine the current according to a signal received from at least one of the selection switch, the change switch and the return switch, and to transmit a control signal according to the determined current; and a drive portion adapted to control the steering force according to the control signal received from the control portion.

8. The system of claim 7, wherein the change switch comprises:

a first change switch adapted to change the current to weight the steering force; and a second change switch adapted to change the current to lighten the steering force.

9. The system of claim 7, wherein the steering modes selected by the selection switch comprises a standard mode where a steering force at a normal driving state is provided;

a comfort mode where a steering force heavier than that at the standard mode is provided; and a sports mode where a steering force lighter than that at the standard mode is provided.

\* \* \* \* \*